US008834783B2

(12) United States Patent
Soga

(10) Patent No.: US 8,834,783 B2
(45) Date of Patent: Sep. 16, 2014

(54) METHOD AND APPARATUS FOR PRODUCING CERAMIC MOLDING

(75) Inventor: Wataru Soga, Miyako-gun (JP)

(73) Assignee: Hitachi Metals, Ltd., Tokyo (JP)

(*) Notice: Subject to any disclaimer, the term of this patent is extended or adjusted under 35 U.S.C. 154(b) by 490 days.

(21) Appl. No.: 13/120,732

(22) PCT Filed: Sep. 17, 2009

(86) PCT No.: PCT/JP2009/066310
§ 371 (c)(1),
(2), (4) Date: Mar. 24, 2011

(87) PCT Pub. No.: WO2010/035699
PCT Pub. Date: Apr. 1, 2010

(65) Prior Publication Data
US 2011/0180956 A1 Jul. 28, 2011

(30) Foreign Application Priority Data
Sep. 26, 2008 (JP) ................ 2008-248465

(51) Int. Cl.
B28B 3/24 (2006.01)
B28B 3/20 (2006.01)
B30B 11/22 (2006.01)
B30B 11/26 (2006.01)

(52) U.S. Cl.
CPC . *B28B 3/24* (2013.01); *B28B 3/206* (2013.01); *B30B 11/224* (2013.01); *B30B 11/26* (2013.01)
USPC .......................... 264/630; 264/631

(58) Field of Classification Search
USPC ................ 264/630, 631
See application file for complete search history.

(56) References Cited

U.S. PATENT DOCUMENTS

| 2,513,795 | A | * | 7/1950 | Gliss .............................. 137/545 |
| 3,032,822 | A | | 5/1962 | Maddock |
| 3,856,277 | A | * | 12/1974 | Tiramani ....................... 210/447 |
| 3,888,963 | A | * | 6/1975 | Orso et al. .................. 264/211.11 |
| 4,237,014 | A | * | 12/1980 | Trott ............................... 210/330 |
| 4,268,391 | A | * | 5/1981 | Paquette ........................ 210/236 |
| 6,342,156 | B1 | * | 1/2002 | Sanders et al. ................ 210/224 |
| 7,276,194 | B2 | * | 10/2007 | Shalkey .................... 264/177.12 |
| 2002/0039604 | A1 | | 4/2002 | Yamaguchi et al. |
| 2005/0046072 | A1 | * | 3/2005 | Shalkey ........................ 264/169 |
| 2006/0208397 | A1 | * | 9/2006 | Ichikawa ....................... 264/631 |

FOREIGN PATENT DOCUMENTS

| DE | 606 198 D1 | 11/1934 |
| DE | 30 33 056 A1 | 5/1981 |
| JP | 60-045564 A | 3/1985 |
| JP | 06-000807 A | 1/1994 |

(Continued)

OTHER PUBLICATIONS

European Search Report dated Mar. 28, 2012 of the corresponding European Patent Application No. EP 09 816 114.4.

*Primary Examiner* — Joseph S Del Sole
*Assistant Examiner* — Russell Kemmerle, III
(74) *Attorney, Agent, or Firm* — Sughrue Mion, PLLC

(57) ABSTRACT

A molding apparatus for producing a ceramic molding comprising a material-flowing path, a molding die disposed at one end of the material-flowing path, and a pressurizing means for extrusion-molding the molding material; the material-flowing path comprising pluralities of porous plates for passing the molding material and a screen fixed therebetween, and a method for producing a ceramic molding using this apparatus.

15 Claims, 2 Drawing Sheets

(56) References Cited

FOREIGN PATENT DOCUMENTS

| JP | 06-74306 A | 10/1994 |
| JP | 11-070303 A | 3/1999 |
| JP | 2002-028908 A | 1/2002 |
| JP | 2008-137186 A | 6/2008 |

\* cited by examiner

METHOD AND APPARATUS FOR PRODUCING CERAMIC MOLDING

CROSS REFERENCE TO RELATED APPLICATIONS

This application is a National Stage of International Application No. PCT/JP2009/066310 filed Sep. 17, 2009, claiming priority based on Japanese Patent Application No. 2008-248465 filed Sep. 26, 2008, the contents of all of which are incorporated herein by reference in their entirety.

FIELD OF THE INVENTION

The present invention relates to a method and apparatus for producing a ceramic molding by extrusion-molding a molding material charged into a material-flowing path from a molding die disposed at one end of the material-flowing path.

BACKGROUND OF THE INVENTION

To reduce harmful substance contained in exhaust gases discharged from the engines of automobiles, etc., exhaust-gas-cleaning, catalytic converters and particulate-matter-capturing filters comprising ceramic honeycomb structures are used. Usually, the ceramic honeycomb structure comprises a peripheral wall, and a large number of cells defined by orthogonal cell walls inside the peripheral wall.

The ceramic honeycomb structure is produced, for example, by blending cordierite-forming material powders, a binder, and if necessary, molding aids such as a pore-forming material, a dispersant, a lubricant, etc. with water, supplying the resultant plasticizable molding material to a material-flowing path of a molding apparatus, pushing the molding material toward honeycomb grooves disposed at one end of the material-flowing path by a plunger, etc., extrusion-molding the molding material through the honeycomb grooves, cutting the extrudate to a predetermined length to obtain a honeycomb molding, and drying and sintering it.

The molding die comprises a large number of material-supplying holes disposed on the upstream side, and molding grooves disposed on the downstream side for communicating with the material-supplying holes. Because the material-supplying holes and the molding grooves have extremely fine structures, foreign matter, insufficiently blended starting material bulks, etc. contained in the molding material may be trapped in the material-supplying holes or the molding grooves in the course of extruding the molding material through the molding die. As a result, an uneven molding speed, the bending of moldings, and the clogging of the material-supplying holes or the molding grooves occur, resulting in partially defective cell walls (broken cells). Broken cells provide ceramic honeycomb structures with insufficient strength, resulting in breakage during use, and low particulate-matter-capturing efficiency when they are used as particulate-matter-capturing filters. To remove foreign matter from the molding material, improve the uniformity of the starting material, or to prevent the moldings from bending, the following technologies have been disclosed.

JP 60-45564 B discloses a wet ceramic extrusion-molding apparatus comprising a breaker plate (porous plate) between a screw tip and a die, the breaker plate holding a screen assembly comprising at least three pairs of coarse screens and fine screens laminated alternately, the screen assembly being arranged such that a coarse screen is opposite to the breaker plate, and other fine screens than that constituting a pair with the coarse screen opposing the breaker plate being provided with notch holes. JP 60-45564 B describes that the notch holes increase the effective areas of fine screens, thereby increasing the usable time period of filters (screens).

JP 6-807 A discloses a molding apparatus comprising a wear-resistant metal net screen disposed between an auger screw and an orifice on its downstream side, and a dividing plate (porous plate) having a large number of holes and disposed downstream of the screen for reinforcing the screen. JP 6-807 A describes that because the wear-resistant metal net screen removes a hard material and lamination, moldings free from sagging and breakage during sintering can be obtained.

However, while extrusion-molding the molding material in the molding apparatuses described in JP 60-45564 B and JP 6-807 A, a portion of the screen covering the penetrating holes of the porous plate is subject to an excess load, so that screen-constituting wires are expanded by repeated molding, providing the screen with large openings, and sometimes breaking it. The expansion of screen openings and the breakage of screens make it less effective to remove foreign matter and insufficiently blended starting material bulks from the molding material, providing the extruded moldings with bent or broken cells.

Also, when a plunger-type extrusion-molding apparatus is used, the molding material is not continuously but batchwise supplied to a material-flowing path one after another. Accordingly, the plunger should be retreated to the upstream side upon completion of each step. When the plunger is retreated to the upstream side, a molding material 171 remaining in the material-flowing path moves upstream with the plunger 16 as shown in FIG. 5(a). Accordingly, the screen 15 may peel from the porous plate 14 in the structures of porous plates and screens described in JP 60-45564 B and JP 6-807 A. Particularly in the case of a molding material comprising ceramic materials and a foaming or foamed resin as a pore-forming material, the resin released from the extrusion pressure expands when the plunger retreats upstream, pushing the molding material remaining in the material-flowing path upstream, so that the screen easily peels from the porous plate.

When the next batch of a molding material 17 is charged into the material-flowing path and molded, the screen 15 peeling from the porous plate 14 is bent, resulting in a bent portion 152, and a portion 142 free from the screen 15, as shown in FIG. 5(b). The molding material has a high flow rate in the portion 142 free from the screen 15, while it has a low flow rate in the bent portion 152 of the screen 15, resulting in bent ceramic moldings. Further, in the portion 142 free from the screen 15, moldings are contaminated with foreign matter and insufficiently blended starting material blocks in the starting material, and foreign matter clogs the die, likely resulting in honeycomb moldings with broken cells.

Although the pores 141 of the porous plate 14 can be fixed to the screen 15 with wires 20, for instance, as shown in FIG. 5(c), lest that a center portion of the screen peels from the porous plate when the plunger returns to the upstream side after the completion of one-batch molding, the wires may be broken by wearing after repeated molding, with their debris mixed into moldings and clogging the die, resulting in honeycomb moldings with broken cells. Further, with the wires broken by wearing, the screen peels from the porous plate when the plunger returns to the upstream side after the completion of one-batch molding, resulting in the deformed portions 152 of the screen 15 and portions 142 free from the screen 15, as shown in FIG. 5(b). Thus, the resultant ceramic moldings are bent and have broken cells, as described above.

JP 2008-137186 A discloses an extrusion-molding apparatus comprising an extrusion screw means having an extrusion screw in a barrel for blending and advancing a ceramic material, and a molding die connected to a tip end of the extrusion screw means via a resistance pipe; a ceramic material pushed into the resistance pipe from the extrusion screw means being extruded from the molding die to form a ceramic molding having a desired shape; a rectifying plate (porous plate) having pluralities of openings for passing the ceramic material being disposed between the extrusion screw means and the resistance pipe; the rectifying plate having pluralities of regions; and at least one region having a different opening ratio from those of the other regions. It also discloses the adjustment of the opening ratio by laminating a rectifying plate (A) having the same opening ratio in all regions with a rectifying plate (B), ¾ of which is cut off to provide a penetrating hole, and the overlapping of the openings being changed by making their phases out of alignment. JP 2008-137186 A describes that the rectifying plate has different opening ratios from region to region, to adjust the flow rate of the ceramic material passing through the regions of the rectifying plate, thereby suppressing unevenness in the flow rate of the ceramic material in the extrusion-molding apparatus, and the bending of the resultant ceramic moldings.

However, although the molding apparatus described in JP 2008-137186 A comprises a porous plate having adjusted opening ratios in regions for suppressing the bending of moldings, it does not comprise a screen, so that the moldings are contaminated with foreign matter and insufficiently blended starting material bulks in the starting material, and that foreign matter clogs the die, resulting in honeycomb moldings with broken cells. In the molding apparatus described in JP 2008-137186 A, when a screen is disposed upstream of two rectifying plates (A), (B) to prevent the moldings from being contaminated with foreign matter and insufficiently blended starting material bulks in the starting material, as described in JP 60-45564 B and JP 6-807 A, an excess load is applied to part of the screen covering the penetrating holes of the rectifying plate, so that wires are elongated by repeated molding to expand the openings of the screen, and that the screen may be broken. If the screen has expanded openings or is broken, its function of removing foreign matter and insufficiently blended starting material bulks in the molding material is reduced, resulting in bent moldings and those with broken cells.

OBJECT OF THE INVENTION

Accordingly, an object of the present invention is to provide a method and an apparatus for producing ceramic moldings free from bent or broken cells by extruding a molding material charged into a material-flowing path from a molding die, with foreign matter and insufficiently blended starting material bulks in the molding material effectively removed.

It is further to provide a method and an apparatus, in which a screen for removing the foreign matter, etc. in the molding material is resistant to deformation (expansion of openings, bending, etc.) even after repeated extrusion-molding. It is particularly to provide ceramic moldings free from bent or broken cells, even when a ceramic molding material comprises a foaming or foamed resin as a pore-forming material, or when the ceramic moldings have honeycomb structures.

DISCLOSURE OF THE INVENTION

As a result of intense research in view of the above objects, the inventors have found that a screen for removing foreign matter, etc. in the molding material is resistant to deformation when it is fixed between two porous plates. The present invention has been completed based on such finding.

Thus, the first method of the present invention for producing a ceramic molding, using a molding apparatus comprising a material-flowing path and a molding die disposed at one end of the material-flowing path, comprises extrusion-molding a molding material charged into the material-flowing path from the molding die, through pluralities of porous plates and a screen fixed therebetween in the material-flowing path.

The second method of the present invention for producing a ceramic molding, using a molding apparatus comprising a material-flowing path and a molding die disposed at one end of the material-flowing path, comprises extrusion-molding a molding material charged into the material-flowing path from the molding die, through pluralities of porous plates disposed in the material-flowing path, and pluralities of laminated screens fixed therebetween.

Among pluralities of the screens, a screen on the downstream side of the material-flowing path preferably has a larger opening ratio than that of a screen on the upstream side.

The molding material is preferably obtained by blending at least ceramic materials, a binder and water. The opening width of the screen is preferably 2-10 times the maximum particle size of the ceramic materials.

Pluralities of the porous plates preferably have a pore diameter $1/10$ or less of the inner diameter of the material-flowing path, and an opening area ratio 50% or more of the cross section area of the material-flowing path.

Among pluralities of the porous plates, the porous plate on the downstream side of the material-flowing path preferably has a smaller opening area ratio than that of the porous plate on the upstream side.

The ceramic molding preferably has a honeycomb structure.

The first molding apparatus of the present invention for producing a ceramic molding comprises a material-flowing path, a molding die disposed at one end of the material-flowing path, and a pressurizing means for extrusion-molding the molding material; the material-flowing path comprising pluralities of porous plates for passing the molding material and a screen fixed therebetween.

The second molding apparatus of the present invention for producing a ceramic molding comprises a material-flowing path, a molding die disposed at one end of the material-flowing path, and a pressurizing means for extrusion-molding the molding material; the material-flowing path comprising pluralities of porous plates for passing the molding material and pluralities of laminated screens fixed therebetween.

The molding die preferably has honeycomb-shaped molding grooves.

DESCRIPTION OF THE PREFERRED EMBODIMENTS

[1] Ceramic-Molding Apparatus (1) First Molding Apparatus

The first molding apparatus comprises a material-flowing path, a molding die disposed at one end of the material-flowing path, and a pressurizing means for extrusion-molding a molding material obtained by blending ceramic materials, a binder, water, and if necessary, a molding aid, a pore-forming material, etc.; the material-flowing path comprising pluralities of porous plates for passing the molding material and a screen fixed therebetween.

(i) Structures of Porous Plates and Screen

The screen is fixed between two arbitrary porous plates among pluralities of the porous plates. For example, two porous plates and one screen are used for a combination of a porous plate, a screen and a porous plate, and three porous plates and two screens are used for a combination of a porous plate, a screen, a porous plate, a screen and a porous plate. The same is true of more porous plates and screens.

The porous plates and the screen are preferably firmly fixed, lest that the screen is displaced. It is particularly effective that a screen is sandwiched by the porous plates, with the porous plates fixed with bolts. The porous plates and the screen are preferably perpendicular to an extrusion direction of the material-flowing path.

(ii) Porous Plates

Figure 2:
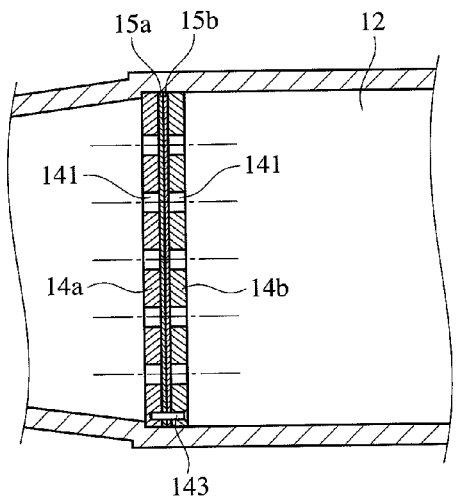
FIG. 2 is a cross-sectional view schematically showing porous plates and screens disposed in a material-flowing path in the molding apparatus of the present invention.
Figure 3:
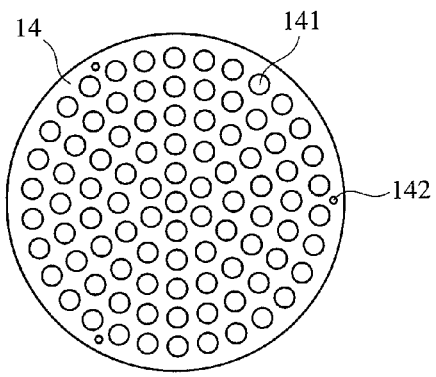
FIG. 3 is a front view schematically showing a porous plate in the molding apparatus of the present invention.

The porous plates used in the molding apparatus are preferably in a circular shape having a large number of pores as shown in FIG. 3, whose materials are metals (structural steel, tool steel, stainless steel, etc.), ceramics, etc. Though the pores may be in any shape, they are preferably circular from the aspect of strength and productivity of the porous plates. Though the pores may be positioned arbitrarily, their positions are preferably concentric to suppress the flow rate unevenness of the molding material. To have good rectifiability of the molding material, pluralities of porous plates are disposed in the material-flowing path such that their pores are substantially aligned with respect to center axes, thereby preventing the ceramic moldings from bending. In order that pluralities of porous plates have pores with substantially aligned center axes, for example, a porous plate 14a having female screws 142 at predetermined positions is preferably fixed with bolts 143 to another porous plate 14b having holes at the corresponding positions for receiving bolts 143, as shown in FIG. 2. The female screws 142 and the holes receiving the bolts 143 are positioned such that the pores 141,141 of two porous plates 14a, 14b are substantially aligned with respect to center axes. The center axis deviation of the pores is preferably 1/10 or less of the pore diameter. The opening area ratio of the porous plates is determined by $(A_1/A_0) \times 100$, wherein $A_0$ is the area of each porous plate, and $A_1$ is the total area of pores in each porous plate.

Each porous plate preferably has a pore diameter 1/10 or less of the inner diameter of the material-flowing path, and an opening area ratio 50% or more of the cross section area of the material-flowing path. With such pore diameter, the porous plates have enough strength with small flow rate unevenness of the molding material during extrusion molding, thereby preventing the ceramic moldings from bending. When the pore diameter of the porous plates exceeds 1/10 of the inner diameter of the material-flowing path, the porous plates have small rectification effects, resulting in the molding material with an uneven flow rate. When the opening area ratio of the porous plates is less than 50% of the cross section area of the material-flowing path, there is large molding resistance, resulting in a low molding speed and low productivity. Because too large opening area ratio reduces the strength of the porous plates, it is preferably 80% or less.

Among pluralities of porous plates, a porous plate on the downstream side of the material-flowing path preferably has a smaller opening area ratio than that of a porous plate on the upstream side. With such structure, the molding material is well rectified during extrusion, preventing the ceramic moldings from bending. The "downstream side" means a closer side to the molding die in the material-flowing path, and the "upstream side" means an opposite side to the molding die in the material-flowing path.

(iii) Screen

Figure 4:
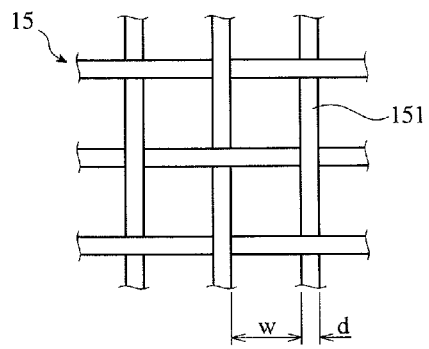
FIG. 4 is a schematic view for explaining the opening ratio of the screen.
Figure 5A:
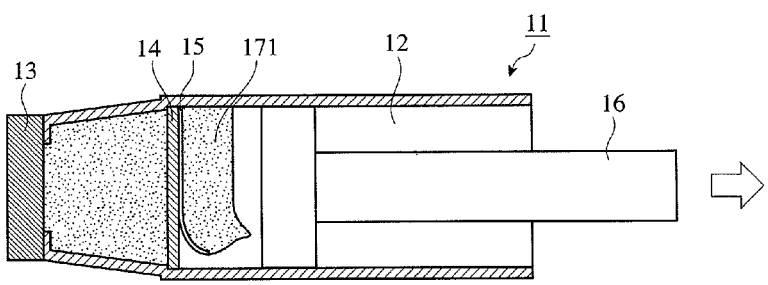
FIG. 5(a) is a schematic view showing the peeling of a conventional screen when a plunger returns to the upstream side.
Figure 5B:
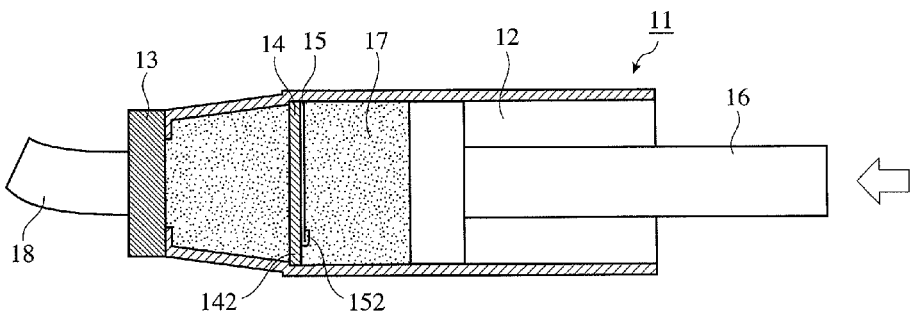
FIG. 5(b) is a schematic view showing a bent conventional screen.
Figure 5C:
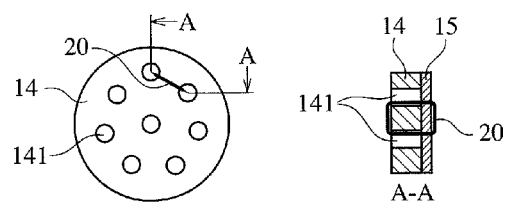
FIG. 5(c) is a schematic view showing a conventional screen fixed to a porous plate with a wire.

The screen used in the molding apparatus is an orthogonally woven wire mesh with a wire diameter d and an opening width w, as shown in FIG. 4. Materials for the screen are preferably metals such as stainless steel, zinc-plated steel, brass, copper, nickel, etc. In place of wires having a diameter d, ribbons having a width d may be used to form the mesh. The opening ratio of the screen is determined from the wire diameter d and opening width w of the screen by $[w^2/(w+d)^2] \times 100$.

The opening width of the screen is preferably 2-10 times the maximum particle size of ceramic materials, to remove foreign matter and insufficiently blended starting material bulks in the molding material, and to keep enough rectifiability of the molding material. When the opening width of the screen is less than 2 times the maximum particle size of the starting material, there is large molding resistance, resulting in a low molding speed and low productivity. On the other hand, when it exceeds 10 times, foreign matter and insufficiently blended starting material bulks in the molding material cannot be removed sufficiently.

For instance, when three porous plates and two screens are used in a combination of a porous plate, a screen, a porous plate, a screen and a porous plate, screens disposed on the upstream and downstream sides in the material-flowing path may have any relations with respect to the opening ratio, but at least a screen on the upstream side preferably has an opening width 2-10 times the maximum particle size of ceramic materials. More preferably, all screens have opening widths 2-10 times the maximum particle size of ceramic materials. The openings of the screens need not be aligned, but they are preferably positioned arbitrarily to prevent the deformation of the screens.

(iv) Pressurizing Means

The pressurizing means for extrusion-molding the molding material may be a screw, a plunger, etc., and preferably a plunger.

(v) Functions

With a screen fixed between two porous plates, screen-constituting wires are not elongated even when an excess load is applied to the screen covering the penetrating holes of the porous plates. Because the openings of the screen are not expanded even after repeated extrusion-molding, foreign matter and insufficiently blended starting material bulks in the molding material can be well removed, preventing them from entering the molding and clogging the die. Particularly when honeycomb-shaped moldings are produced using a die having honeycomb-shaped molding grooves, they can effectively be prevented from having broken cells.

The porous plates and the screen are preferably used in a plunger-type extrusion-molding apparatus. In the case of a plunger-type extrusion-molding apparatus, the molding material is supplied not continuously but intermittently; after one batch is extrusion-molded, the next molding material is charged into the material-flowing path. Therefore, the plunger should be retreated to the upstream side. In this case, the molding material remaining in the material-flowing path moves upstream together with the plunger, exerting an upstream force to the screen. However, because the screen is supported by a porous plate on the upstream side, it does not peel from the porous plate on the downstream side. Therefore, the next batch of a molding material charged into the material-flowing path is well extrusion-molded without bending, etc.

(2) Second Molding Apparatus

The second molding apparatus comprises a material-flowing path, a molding die disposed at one end of the material-flowing path, and a pressurizing means for extrusion-molding a molding material obtained by blending ceramic materials, a binder, water, and if necessary, a molding aid, a pore-forming material, etc.; the material-flowing path comprising pluralities of porous plates for passing the molding material, and pluralities of laminated screens fixed therebetween.

In the second molding apparatus, two or more screens are laminated and fixed between two arbitrary porous plates. For example, two porous plates and two screens are used for a combination of a porous plate, a screen, a screen and a porous plate, and three porous plates and four screens are used for a combination of a porous plate, a screen, a screen, a porous plate, a screen, a screen and a porous plate. The same is true of more porous plates and screens. Fixed between two arbitrary porous plates are not restricted to two screens, but may be three or more screens. In the case of using three or more porous plates, the numbers of screens fixed therebetween may be the same or different. Plural screens need only be fixed at one site, and one screen may be fixed in part of the combination. For example, three porous plates and three screens may be used for a combination of a porous plate, a screen, a porous plate, a screen, a screen and a porous plate. The porous plates and screens used may be the same as in the first molding apparatus, and their structures are preferably the same as in the first molding apparatus.

With pluralities of screens fixed between pluralities of porous plates, screen-constituting wires are less elongated than a case where one screen is fixed, so that the openings of the screens are less expanded even after repeated extrusion-molding. Also, pluralities of screens can well remove foreign matter and insufficiently blended starting material bulks in the molding material.

When pluralities of screens are laminated, a screen on the downstream side of the material-flowing path preferably has a larger opening ratio than that of a screen on the upstream side. A force applied to the screen while the molding material passes becomes larger as the opening ratio becomes smaller, so that a large force is not applied to a screen with a large opening ratio. Therefore, with screens arranged such that the opening ratio increases successively from the upstream side, the deformation of a screen with a smaller opening ratio on the upstream side, which is caused by a force applied when the molding material passes, is prevented by a less deformable screen with a larger opening ratio on the downstream side, so that the openings of the screen on the upstream side can be prevented from expanding.

The opening ratio of a screen on the downstream side is preferably 105-150% of the opening ratio of an adjacent screen on the upstream side. When it is less than 105%, there is large molding resistance, resulting in a low molding speed and low productivity. On the other hand, when it exceeds 150%, a screen with a smaller opening ratio on the upstream side does not well prevent the deformation of a screen on the downstream side.

When pluralities of screens are laminated, at least a screen on the upstream side preferably has an opening width 2-10 times the maximum particle size of ceramic materials, and all screens more preferably have opening widths 2-10 times the maximum particle size of ceramic materials.

[2] Production Method

The first method for producing a ceramic molding uses the first apparatus. Namely, it is a method using a molding apparatus comprising a material-flowing path and a molding die disposed at one end of the material-flowing path to extrusion-mold a molding material charged into the material-flowing path from the molding die, through pluralities of porous plates and a screen fixed therebetween in the material-flowing path.

The second method for producing a ceramic molding uses the second apparatus. Namely, it is a method using a molding apparatus comprising a material-flowing path and a molding die disposed at one end of the material-flowing path to extrusion-mold a molding material charged into the material-flowing path from the molding die, through pluralities of porous plates and pluralities of laminated screens fixed therebetween in the material-flowing path.

Molding materials used in the first and second methods are preferably obtained by blending ceramic materials, a binder, water, and if necessary, a molding aid, a pore-forming material, etc. The pore-forming material may be particularly foamed resins, graphite, etc.

When ceramic moldings are produced by the first and second methods, the openings of the screens are resistant to expansion even after repeated extrusion-molding, well removing foreign matter and insufficiently blended starting material bulks in the molding material, and thus preventing the foreign matter and the starting material bulk from entering the moldings and the die from being clogged. Particularly in the production of honeycomb-shaped ceramic moldings, too, the breakage and bending of cells can be effectively prevented. The first and second methods may be used in the plunger-type extrusion-molding apparatus, too.

[3] Examples

The present invention will be described in more detail with reference to Examples below without intention of restricting the scope of this invention.

Molding Apparatus

Figure 1:
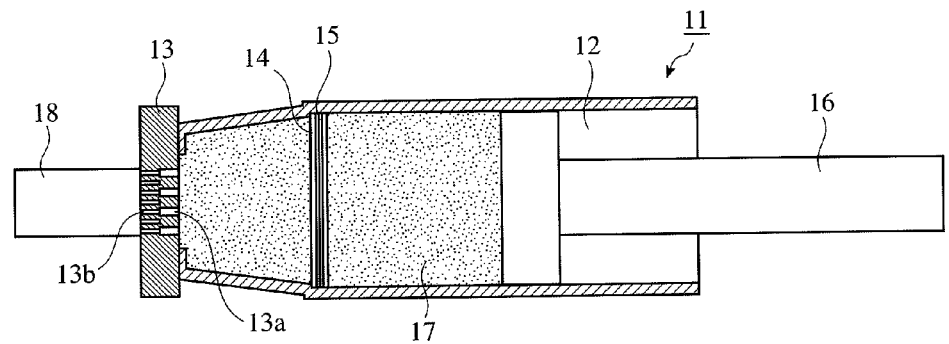
FIG. 1 is a cross-sectional view schematically showing one example of the molding apparatuses of the present invention.

The molding apparatus 11 shown in FIG. 1 was used. The molding apparatus 11 is a plunger-type molding apparatus comprising a material-flowing path 12 having an inner diameter of 340 mm, a molding die 13 disposed at one end of the material-flowing path 12, a plunger 16 for extruding a molding material 17, and porous plates 14 and screens 15 disposed in the material-flowing path 12. Disposed in the material-flowing path 12 are a porous plate 14a on the downstream side, a porous plate 14b on the upstream side, and two screens 15a, 15b fixed between them and made of stainless steel (SUS304), as shown in FIG. 2. The openings of two screens need not be aligned but may be arranged arbitrarily with respect to center axes. As shown in FIG. 3, each porous plate 14a, 14b is a disc of 340 mm in outer diameter and 50 mm in thickness made of stainless steel (SUS304), which concentrically has pores 141. The porous plates 14a and 14b were arranged such that their pores 141 were substantially aligned with respect to center axes.

The molding die 13 has supply holes 13a and molding grooves 13b on both surfaces, the molding grooves 13b being in a perpendicularly crossing lattice pattern with 0.18-mm-wide grooves at 1.35-mm pitches. The molding die 13 can produce a cordierite honeycomb structure 18 having a diameter of 266 mm and a length of 300 mm after sintering.

Example 1

Using two porous plates A shown in Table 1 and screens B and C shown in Table 2, the screens B and C were fixed between two porous plates A at a predetermined position in the molding apparatus 11, with the screen C on the upstream side. Ceramic materials having the maximum particle size of 250 μm, a foamed resin as a pore-forming material, a binder and water were blended to prepare a cordierite molding material 17. The molding material 17 was charged into the material-flowing path 12 of the molding apparatus 11, and a plunger 16 was pushed toward a honeycomb-shaped molding die 13 disposed at one end of the material-flowing path 12, to extrude 300-mm-long ceramic honeycomb moldings until the length of the resultant molding did not reach 300 mm. After returning the plunger to the upstream side, the second batch of the molding material 17 was similarly charged into the material-flowing path 12, to extrude 300-mm-long ceramic honeycomb moldings 18 until the length of the resultant molding did not reach 300 mm.

TABLE 1

| Type of Porous Plates | $Dp^{(1)}$ (mm) | Number of Pores | $Dp/Din^{(2)}$ | Opening Area Ratio (%) |
|---|---|---|---|---|
| Porous Plate A | 20 | 91 | 0.06 | 31.5 |
| Porous Plate B | 28 | 91 | 0.08 | 61.7 |

Note:
$^{(1)}$Dp is a pore diameter.
$^{(2)}$Din is the inner diameter of the material-flowing path.

TABLE 2

| Type of Screen | Number of Meshes (/inch) | Wire Diameter (μm) | Opening Width (μm) | Opening Ratio (%) |
|---|---|---|---|---|
| Screen A | 8 | 900 | 2275 | 51 |
| Screen B | 10 | 900 | 1640 | 42 |
| Screen C | 20 | 400 | 870 | 47 |
| Screen D | 24 | 400 | 658 | 39 |
| Screen E | 30 | 340 | 507 | 36 |
| Screen F | 40 | 290 | 345 | 30 |

Examples 2-14 and Comparative Examples 1-3

Ceramic honeycomb moldings 18 were produced in the same manner as in Example 1, except for changing the porous plates 14 and the screens 15 as shown in Table 3. Example 10 used three screens, and Examples 13 and 14 and Comparative Example 3 used one screen. A screen was supported by only one porous plate in Comparative Examples 1 and 3, and only two porous plates without a screen were used in Comparative Example 2.

Example 15

A ceramic honeycomb molding 18 was produced in the same manner as in Example 1, except for using graphite in place of a foamed resin as the pore-forming material.

TABLE 3

| | Porous Plates | | |
|---|---|---|---|
| No. | Number | Downstream Side Type | Upstream Side Type |
| Example 1 | 2 | A | A |
| Example 2 | 2 | A | A |
| Example 3 | 2 | A | A |
| Example 4 | 2 | A | A |
| Example 5 | 2 | A | A |
| Example 6 | 2 | A | A |
| Example 7 | 2 | A | B |
| Example 8 | 2 | B | B |
| Example 9 | 2 | B | B |
| Example 10 | 2 | B | B |
| Example 11 | 2 | B | B |
| Example 12 | 2 | B | B |
| Example 13 | 2 | A | A |
| Example 14 | 2 | B | B |
| Example 15 | 2 | A | A |
| Comparative Example 1 | 1 | B | — |
| Comparative Example 2 | 2 | B | A |
| Comparative Example 3 | 1 | B | — |

| | Screens | | | | |
|---|---|---|---|---|---|
| | | Upstream Side | Downstream Side | | Most Downstream Side | |
| No. | Number | Type | Type | Opening Ratio$^{(1)}$ | Type | Opening Ratio$^{(2)}$ |
| Example 1 | 2 | C | B | 89% | — | — |
| Example 2 | 2 | C | C | 100% | — | — |
| Example 3 | 2 | C | E | 76% | — | — |
| Example 4 | 2 | C | A | 109% | — | — |
| Example 5 | 2 | E | B | 116% | — | — |
| Example 6 | 2 | E | C | 131% | — | — |
| Example 7 | 2 | E | C | 131% | — | — |
| Example 8 | 2 | E | C | 131% | — | — |
| Example 9 | 2 | E | D | 108% | — | — |
| Example 10 | 3 | E | D | 108% | B | 108% |
| Example 11 | 2 | F | A | 174% | — | — |
| Example 12 | 2 | C | E | 76% | — | — |
| Example 13 | 1 | C | — | — | — | — |
| Example 14 | 1 | C | — | — | — | — |
| Example 15 | 2 | C | B | 89% | — | — |
| Comparative Example 1 | 2 | E | C | 131% | — | — |
| Comparative Example 2 | No | — | — | — | — | — |
| Comparative Example 3 | 1 | E | — | — | — | — |

Note:
$^{(1)}$Opening ratio (%) = (opening ratio of screen on the downstream side/opening ratio of screen on the upstream side) × 100.
$^{(2)}$opening ratio (%) = (opening ratio of screen on the most downstream side/opening ratio of screen on the downstream side) × 100

Two batches of the ceramic moldings produced in Examples 1-15 and Comparative Examples 1-3 were evaluated with respect to the breakage of cells and bending.

The breakage of cells was evaluated by the percentage of moldings having broken cells to those produced, by the following standard.

Excellent: The percentage was less than 1%,
Good The percentage was 1% or more and less than 3%,
Fair The percentage was 3% or more and less than 5%, and
Poor The percentage was 5% or more.
The bending was evaluated by the following standard.
Good All moldings produced were free from bending, and
Poor At least one molding suffered bending.
The results are shown in Table 4.

TABLE 4

| No. | Evaluation Results | |
|---|---|---|
| | Breakage of Cells | Bending |
| Example 1 | Fair | Good |
| Example 2 | Fair | Good |
| Example 3 | Fair | Good |
| Example 4 | Good | Good |
| Example 5 | Excellent | Good |
| Example 6 | Good | Good |
| Example 7 | Good | Good |
| Example 8 | Good | Good |
| Example 9 | Good | Good |
| Example 10 | Excellent | Good |
| Example 11 | Fair | Good |
| Example 12 | Good | Good |
| Example 13 | Fair | Good |
| Example 14 | Fair | Good |
| Example 15 | Good | Good |
| Comparative Example 1 | Poor | Poor |
| Comparative Example 2 | Poor | Good |
| Comparative Example 3 | Poor | Poor |

As shown in Table 4, the ceramic honeycomb moldings produced in Examples 1-15 suffered substantially no breakage of cells and completely no bending in two batches of extrusion-molding. The ceramic honeycomb molding produced in Comparative Example 1 suffered much bending in the second batch. The ceramic honeycomb moldings produced in Comparative Examples 2 and 3 also largely suffered the breakage of cells in the second batch of extrusion-molding.

Effect of the Invention

According to the method and apparatus of the present invention, foreign matter and insufficiently blended starting material bulks in the molding material are effectively removed, and the breakage of cells and bending of ceramic moldings can be prevented in extrusion molding. Particularly when molding materials comprising foaming or foamed resins as pore-forming materials together with ceramic materials are used, or when honeycomb-shaped ceramic moldings are produced, the breakage of cells and bending of ceramic moldings can be sufficiently prevented. Thus, high-performance ceramic moldings with improved quality can be obtained with high productivity at low cost.

What is claimed is:

1. A method for producing a ceramic molding using a molding apparatus comprising a material-flowing path and a molding die disposed at one end of said material-flowing path, comprising extrusion-molding a molding material charged into said material-flowing path from said molding die, through pluralities of porous plates and a screen fixed therebetween in said material-flowing path, wherein said pluralities of porous plates are disposed in the material-flowing path such that the pores of the porous plates on opposite sides of the screen are substantially aligned with respect to center axes.

2. The method for producing a ceramic molding according to claim 1, wherein said molding material is obtained by blending at least ceramic materials, a binder and water, the opening width of said screen being 2-10 times the maximum particle size of said ceramic materials.

3. The method for producing a ceramic molding according to clam 1, wherein pluralities of said porous plates have a pore diameter 1/10 or less of the inner diameter of said material-flowing path, and an opening area ratio 50% or more of the cross section area of said material-flowing path.

4. The method for producing a ceramic molding according to claim 1, wherein a porous plate on the downstream side of said material-flowing path among pluralities of said porous plates has a smaller opening area ratio than that of a porous plate on the upstream side, wherein the opening area ratio of the porous plates is determined by $(A_1/A_0) \times 100$, wherein $A_0$ is the area of each porous plate, and $A_1$ is the total area of pores in each porous plate.

5. The method for producing a ceramic molding according to claim 1, wherein said ceramic molding has a honeycomb structure.

6. A method for producing a ceramic molding using a molding apparatus comprising a material-flowing path and a molding die disposed at one end of said material-flowing path, comprising extrusion-molding a molding material charged into said material-flowing path from said molding die, through pluralities of porous plates and pluralities of laminated screens fixed therebetween in said material-flowing path, wherein said pluralities of porous plates are disposed in the material-flowing path such that the pores of the porous plates on opposite sides of the laminated screens are substantially aligned with respect to center axes.

7. The method for producing a ceramic molding according to claim 6, wherein a screen on the downstream side of said material-flowing path among said pluralities of screens has a larger opening ratio than that of a screen on the upstream side.

8. The method for producing a ceramic molding according to claim 6, wherein said molding material is obtained by blending at least ceramic materials, a binder and water, the opening width of said screen being 2-10 times the maximum particle size of said ceramic materials.

9. The method for producing a ceramic molding according to claim 6, wherein pluralities of said porous plates have a pore diameter 1/10 or less of the inner diameter of said material-flowing path, and an opening area ratio 50% or more of the cross section area of said material-flowing path.

10. The method for producing a ceramic molding according to claim 6, wherein a porous plate on the downstream side of said material-flowing path among pluralities of said porous plates has a smaller opening area ratio than that of a porous plate on the upstream side, wherein the opening area ratio of the porous plates is determined by $(A_1/A_0) \times 100$, wherein $A_0$ is the area of each porous plate, and $A_1$ is the total area of pores in each porous plate.

11. The method for producing a ceramic molding according to claim 6, wherein said ceramic molding has a honeycomb structure.

12. A molding apparatus comprising a material-flowing path, a molding die disposed at one end of said material-flowing path, and a pressurizing means for extrusion-molding said molding material; said material-flowing path comprising pluralities of porous plates for passing said molding material and a screen fixed therebetween, wherein said pluralities of porous plates are disposed in the material-flowing path such that the pores of the porous plates on opposite sides of the screen are substantially aligned with respect to center axes.

13. The molding apparatus for producing a ceramic molding according to claim 12, wherein said molding die has honeycomb-shaped molding grooves.

14. A molding apparatus comprising a material-flowing path, a molding die disposed at one end of said material-flowing path, and a pressurizing means for extrusion-molding said molding material; said material-flowing path comprising pluralities of porous plates for passing said molding material and pluralities of laminated screens fixed therebetween, wherein said pluralities of porous plates are disposed in the material-flowing path such that the pores of the porous plates on opposite sides of the laminated screens are substantially aligned with respect to center axes.

15. The molding apparatus for producing a ceramic molding according to claim 14, wherein said molding die has honeycomb-shaped molding grooves.

\* \* \* \* \*